United States Patent [19]

Richter et al.

[11] 3,966,676

[45] June 29, 1976

[54] BIS-(HALOPHENYL) 2,3,5,6-TETRACHLORO-TEREPHTHALATE AND FIRE RETARDANT COMPOSITIONS PREPARED THEREFROM

[75] Inventors: Sidney B. Richter, Chicago; Glendon D. Kyker, Glen Ellyn, both of Ill.

[73] Assignee: Velsicol Chemical Corporation, Chicago, Ill.

[22] Filed: Feb. 18, 1975

[21] Appl. No.: 550,332

[52] U.S. Cl.................. 260/45.75 B; 260/45.85 T; 260/475 PN
[51] Int. Cl.²..................... C08J 3/20; C07C 69/82
[58] Field of Search............ 260/475 PN, 45.85 T, 260/75 H, 45.75 B; 424/308

[56] References Cited
UNITED STATES PATENTS

| 3,080,339 | 3/1963 | Gordon | 260/45.85 T |
| 3,689,529 | 9/1972 | Lehureau et al. | 260/475 PN |
| 3,772,342 | 11/1973 | Foley | 260/45.85 T |
| 3,775,165 | 11/1973 | Young et al. | 260/45.85 T |
| 3,846,469 | 11/1974 | Gunsher et al. | 260/45.85 T |
| 3,849,368 | 11/1974 | Anderson et al. | 260/45.8 R |
| 3,849,522 | 11/1974 | Hills | 260/45.8 R |

*Primary Examiner*—V.P. Hoke
*Attorney, Agent, or Firm*—Robert J. Schwarz; Dietmar H. Olesch

[57] ABSTRACT

This invention discloses chemical compounds of the formula

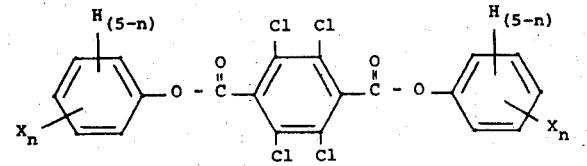

wherein X is chlorine or bromine, and $n$ is an integer from 2 to 5; and fire retardant compositions prepared therefrom.

11 Claims, No Drawings

BIS-(HALOPHENYL) 2,3,5,6-TETRACHLORO-TEREPHTHALATE AND FIRE RETARDANT COMPOSITIONS PREPARED THEREFROM

This invention relates to new compositions of matter and more specifically relates to new chemical compounds having the following structural formula

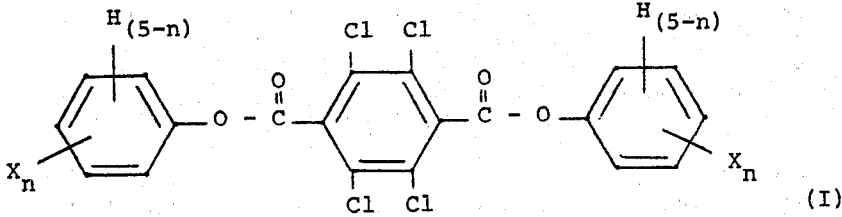
(I)

wherein X is chlorine or bromine, and $n$ is an integer from 2 to 5.

The compounds of the present invention possess exceptional properties in rendering combustible polymers fire retardant when intimately admixed therewith.

The compounds of the present invention can be readily prepared by reacting two molar amounts of a phenol of the formula

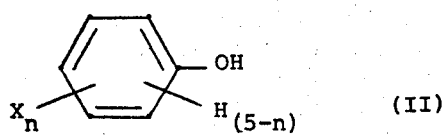
(II)

wherein X and $n$ are as heretofore described, with one molar amount of 2,3,5,6-tetrachloroterephthaloyl chloride. This reaction can be effected by heating a solution of the phenol in an inert organic solvent, such as benzene, at the reflux temperature of the mixture and adding a solution of the tetrachloroterephthaloyl chloride in a similar solvent. This reaction is preferably carried out in the presence of an acid acceptor such as a tertiary amine to remove the hydrogen chloride that is formed. After the addition is completed the reaction mixture can be heated with stirring for a period of from 2 to 24 hours to ensure completion of the reaction. After this time the desired product can be recovered by filtration if formed as a precipitate or upon distillation of the solvent if soluble therein.

Exemplary suitable phenols of formula II useful in preparing the compounds of the present invention are 2,4-dichlorophenol, 3,4-dichlorophenol, 2,4,6-trichlorophenol, 2,3,5,6-tetrachlorophenol, pentachlorophenyl, 2,3-dibromophenol, 3,4-dibromophenol, 2,5-dibromophenol, 2,4,6-tribromophenol, 2,3,5,6-tetrabromophenol, 2,3,4,5-tetrabromophenol, pentabromophenol and the like.

The manner in which the compounds of the present invention can be prepared is more specifically illustrated in the following examples.

EXAMPLE 1

Preparation of Bis-(2,4,6-tribromophenyl) 2,3,5,6-Tetrachloroterephthalate 2,4,6-Tribromophenol (6.11 grams; 0.02 mole), benzene (50 ml) and pyridine (1.76 grams; 0.0223 mole) were charged into a 300 ml glass reaction flask equipped with mechanical stirrer, thermometer and reflux condenser. The mixture was heated to reflux with stirring and 2,3,5,6-tetrachloroterephthaloyl chloride (3.41 grams; 0.01 mole) dissolved in benzene (25 ml) was added over a period of about 15 minutes. The reaction mixture was then heated at reflux with continued stirring for an additional period of about 19 hours resulting in the formation of a white solid. The solid was then recovered by filtration. The solid was washed with a water-methanol mixture, was filtered and dried under vacuum to yield the desired product bis-(2,4,6-tribromophenyl) 2,3,5,6-tetrachloroterephthalate having a melt point of 323° to 326°C.

EXAMPLE 2

Preparation of Bis-(3,4-dichlorophenyl) 2,3,5,6-Tetrachloroterephthalate 3,4-Dichlorophenol (0.10 mole), benzene (200 ml) and pyridine (0.12 mole) are charged into a glass reaction vessel equipped with a mechanical stirrer, thermometer and reflux condenser. The mixture is heated at reflux and 2,3,5,6-tetrachloroterephthaloyl chloride (0.05 mole) dissolved in benzene (75 ml) is added with continuous stirring. After the addition is completed heating and stirring are continued for a period of about 12 hours. After this time the reaction mixture is filtered to recover the solid product which has formed. This product is washed with water and is dried to yield the desired product bis-(3,4-dichlorophenyl) 2,3,5,6-tetrachloroterephthalate.

EXAMPLE 3

Preparation of Bis-(pentabromophenyl) 2,3,5,6-Tetrachloroterephthalate

Pentabromophenol (0.10 mole), benzene (250 ml) and triethylamine (0.13 mole) are charged into a glass reaction vessel equipped with a mechanical stirrer, thermometer and reflux condenser. The mixture is heated at reflux with stirring and 2,3,5,6-tetrachloroterephthaloyl chloride (0.05 mole) dissolved in benzene (100 ml) is added thereto. Heating and stirring are continued for a period of about 24 hours. After this time the reaction mixture is filtered to recover the precipitate that has formed. The precipitate is then washed with a water-methanol mixture and is dried to yield the desired product bis-(pentabromophenyl) 2,3,5,6-tetrachloroterephthalate.

Organic polymeric compositions find wide application in the manufacture of molded and extruded articles as well as in paints, films, coatings and miscellaneous products. Since the great majority of organic polymeric compositions are highly flammable it is desirable to render these fire retardant. It has been found that the compound of this invention possesses the desirable property of rendering organic polymers fire retardant when incorporated therein.

Thus, a further embodiment of the present invention resides in fire retardant polymeric compositions comprising a combustible polymer and a fire retardant amount of a compound of this invention.

The compounds of this invention impart fire retardant properties to combustible polymers by forming intimate admixtures therewith. These admixtures can be readily prepared by one of several methods well known in the art. For example the compounds can be admixed into the combustible polymer while the latter is dissolved in a suitable solvent. This procedure is especially useful when it is desired to incorporate the compound during the preparation of the polymer. The compounds of this invention can also be mixed with a combustible polymer in the molten state at a temperature that can range from the melting point of the polymer to a temperature just below the decomposition temperature of the polymer. Another method of forming an intimate admixture comprises dry blending the compounds with the polymer in the finely divided state. Subsequent molding or extrusion of this blend can then result in a substantially homogeneous composition.

The fire retardant polymeric compositions of the instant invention can contain a fire retarding amount of one or more compounds of this invention. A fire retarding amount of a compound can range from about 5 to about 50 weight percent of the total composition. The exact amount of compound employed will depend upon such factors as the degree of fire retardancy desired, the specific combustible polymer used, the end use of the resulting product and the like.

The compounds of this invention can impart fire retardant properties to a variety of combustible polymers. Exemplary of such polymers which can be used in admixture with the compounds to form the fire retardant polymeric compositions of this invention are the homopolymers and copolymers of unsaturated aliphatic, cycloaliphatic, and aromatic hydrocarbons, such as polyethylene, polypropylene, polybutene, ethylene propylene copolymers, copolymers of ethylene or propylene with other olefins, polybutadiene, polymers of butadiene, polyisoprene, polystyrene, polyvinylidene, and polymers of pentene, hexene, heptene, octene, 2-methylpropene-1, 3-methylbutene-1, 4-methylpentene-1, 4-methylhexene-1, 5-methylhexene-1, bicyclohexene (2.2.1), pentadiene, hexadiene, 2,3-dimethylbutadiene-1,3, 2-methylpentadiene, vinylcyclohexene such as 4-vinylcyclohexene, cyclopentadiene, methylstyrene and the like. Other useful polymers include indene-coumarone resins, polymers of acrylate esters and polymers of methacrylate esters, acrylate and methacrylate resins such as ethyl acrylate, n-butyl methacrylate, isobutyl methacrylate, ethyl methacrylate, and methyl methacrylate, alkyd resins, hydrocarbon resins from petroleum, isobutylene resins, polyurethanes, polyester resins such as unsaturated polyesters of dibasic acids and dihydroxy compounds, polyester elastomers, saturated thermoplastic polyesters, polyisobutylene, rubbers such as natural rubber, synthetic polyisoprene, chlorinated rubber, polybutadiene, cyclized rubber, butadiene-acrylonitrile rubber, butadiene-styrene rubber, butyl rubber, neoprene rubber, terpene resins, urea resins, vinyl resins such as poly(vinyl acetal), poly(vinyl acetate), vinyl alcohol-acetate copolymer, poly(vinyl alcohol), poly(vinyl alkyl ether), vinyl methyl ether-maleic anhydride copolymer, poly(vinyl chloride), poly(vinyl butyral), vinyl chloride-acetate copolymer, poly(vinyl pyrrolidone), vinylidene chloride copolymers and the like. Additional useful polymers include nylon, diallyl phthalates and phthalate resins and polycarbonates.

The fire retardant compositions of this invention can also contain adjuvants which in conjunction with the compounds of this invention improve the fire retardancy of the composition and in some instances provide synergistic results not obtainable with the use of a compound alone. Such adjuvants can comprise antimony compounds such as antimony trioxide, zinc borate, lead arsenates such as $PbHAsO_4$ and the like. These adjuvants can comprise from about 1 to about 35% by weight of the total composition.

The effectiveness of the compounds of this invention as flame retardants was demonstrated in an experiment wherein fire retardant compositions comprising the compound bis-(2,4,6-tribromophenyl) 2,3,5,6-tetrachloroterephthalate and various combustible polymers were subjected to a flammability test using the oxygen index method. The flammability test was carried out in accordance with the general procedures detailed in the ASTM D 2863-70 test method. This method provides a procedure for determining the relative flammability of plastics by measuring the minimum concentration of oxygen expressed as volume percent, in a slowly rising mixture of oxygen and nitrogen that will just support combustion. The results of this experiment are set forth in the following examples. In each of these examples the components were blended in the molten state using a Brabender Plasticorder.

| | Composition Parts by Weight | Oxygen Index Percent |
|---|---|---|
| Example 2 | | |
| Polypropylene | 100 | 21.5 |
| Product of Example 1 | 25 | |
| Example 3 | | |
| ABS* | 100 | 22.5 |
| Product of Example 1 | 20 | |
| Example 4 | | |
| ABS* | 100 | 26.5 |
| Product of Example 1 | 20 | |
| Antimony trioxide | 5 | |

*Terepolymer of acrylonitrile, butadiene and styrene

We claim:
1. A compound of the formula

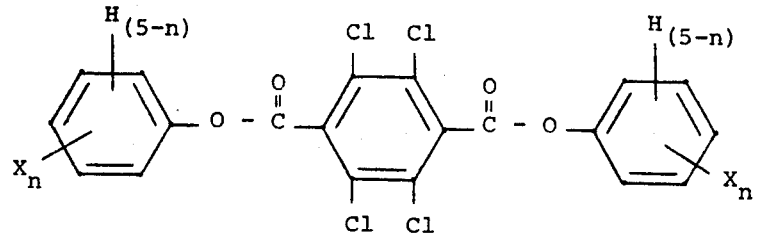

wherein X is chlorine or bromine, and $n$ is an integer from 2 to 5.

2. The compound of claim 1, bis-(2,4,6-tribromophenyl) 2,3,5,6-tetrachloroterephthalate.

3. The compound of claim 1, bis-(3,4-dichlorophenyl) 2,3,5,6-tetrachloroterephthalate.

4. The compound of claim 1, bis-(pentabromophenyl) 2,3,5,6-tetrachloroterephthalate.

5. A fire retardant polymeric composition comprising a combustible polymer and a fire retarding amount of the compound of claim 1.

6. The composition of claim 5 wherein the combustible polymer is polystyrene.

7. The composition of claim 5 wherein the combustible polymer is polyethylene.

8. The combustion of claim 5 wherein the combustible polymer is a terepolymer of acrylonitrile, butadiene and styrene.

9. The composition of claim 5 wherein the combustible polymer is polypropylene.

10. The composition of claim 5 wherein the combustible polymer is a polyester.

11. The composition of claim 5 which contains from about 1 to about 35% by weight of an adjuvant selected from the group consisting of antimony trioxide, zinc borate and lead arsenate.

* * * * *